US007693663B2

(12) United States Patent
Friedlander et al.

(10) Patent No.: US 7,693,663 B2
(45) Date of Patent: Apr. 6, 2010

(54) SYSTEM AND METHOD FOR DETECTION OF EARTHQUAKES AND TSUNAMIS, AND HIERARCHICAL ANALYSIS, THREAT CLASSIFICATION, AND INTERFACE TO WARNING SYSTEMS

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 11/741,186

(22) Filed: Apr. 27, 2007

(65) Prior Publication Data
US 2008/0270034 A1     Oct. 30, 2008

(51) Int. Cl.
*G01V 1/00* (2006.01)
*G08B 21/00* (2006.01)
(52) U.S. Cl. .......................... 702/15; 340/690
(58) Field of Classification Search .............. 702/15, 702/1, 2, 14, 16, 56; 706/929; 340/601, 340/690, 286.01, 286.02, 286.1, 286.2; 455/404.1, 455/404.2; 73/170.29, 170.31, 645; 181/101, 181/122
See application file for complete search history.

(56) References Cited

U.S. PATENT DOCUMENTS 6,265,979 B1    7/2001  Chen et al.
6,718,270 B2 *  4/2004  Horiuchi et al. ............... 702/56
6,950,767 B2 *  9/2005  Yamashita et al. ............ 702/81
2006/0097983 A1  5/2006  Haggman et al.
2007/0199382 A1 * 8/2007  Sakai .......................... 73/645

FOREIGN PATENT DOCUMENTS

WO   WO 2008052786 A1 *  5/2008

OTHER PUBLICATIONS

U.S. Appl. No. 11/516,953, filed Sep. 7, 2006, Friedlander et al.
U.S. Appl. No. 11/516,954, filed Sep. 7, 2006, Friedlander et al.
Harrington, "Knock-based commands for your Linux laptop", pp. 1-11, retrieved 11/17/2006. http://www-128.ibm.com/developerworks/library/l-knockage.html.

* cited by examiner

*Primary Examiner*—Michael P. Nghiem
*Assistant Examiner*—Toan M Le
(74) *Attorney, Agent, or Firm*—Yee & Associates, P.C.; John R. Pivnichny

(57) ABSTRACT

A computer implemented method of producing macro-view conclusion data related to a seismic event. The method includes receiving at a processing center a set of data related to a parameter of a seismic event. The parameter is measured using a vibration sensor of a hard disk drive of a computer at a known, fixed location, wherein the vibration sensor produces the set of data. The method further includes processing the set of data at the processing center to produce the macro-view conclusion data. The macro-view conclusion data is then stored in a storage device.

18 Claims, 6 Drawing Sheets

SYSTEM AND METHOD FOR DETECTION OF EARTHQUAKES AND TSUNAMIS, AND HIERARCHICAL ANALYSIS, THREAT CLASSIFICATION, AND INTERFACE TO WARNING SYSTEMS

BACKGROUND OF THE INVENTION

1. Field of the Invention

The present invention relates generally to an improved data processing system and in particular to a method and apparatus for predicting earthquakes and tsunamis. Still more particularly the present invention relates to a computer implemented method, apparatus, and a computer usable program product for detecting parameters regarding earthquakes and tsunamis using a plurality of hard-disk drives.

2. Description of the Related Art

Detection, prediction, and modeling of earthquakes are increasingly important sciences in modern society, given the size and complexity of modern cities. The physics of earthquakes and earthquake detection is well understood. Actual detection is accomplished at a gross macroscopic level using seismographs distributed over very broad geographical areas. Because seismographs are expensive and relatively rare, the grain of information that seismographs detect is large. In other words, data regarding an earthquake is limited to a few particular geographical locations. For this reason, much information is not collected during an earthquake. Further, the information that is collected is often not correlated to the actual threat level to people and infrastructure. Thus, accessing much more highly detailed data regarding earthquakes is greatly desirable.

SUMMARY OF THE INVENTION

A computer implemented method of producing macro-view conclusion data related to a seismic event. The method includes receiving at a processing center a set of data related to a parameter of a seismic event. The parameter is measured using a vibration sensor of a hard disk drive of a computer at a known, fixed location, wherein the vibration sensor produces the set of data. The method further includes processing the set of data at the processing center to produce the macro-view conclusion data. The macro-view conclusion data is then stored in a storage device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
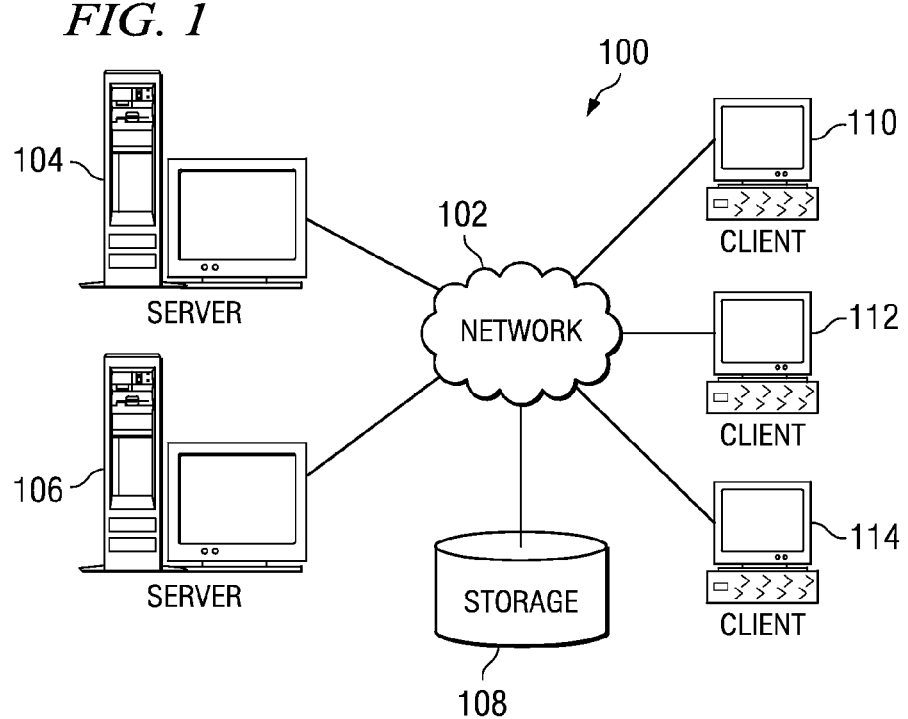
FIG. 1 is a pictorial representation of a network of data processing systems in which aspects of the illustrative embodiments may be implemented.
Figure 2:
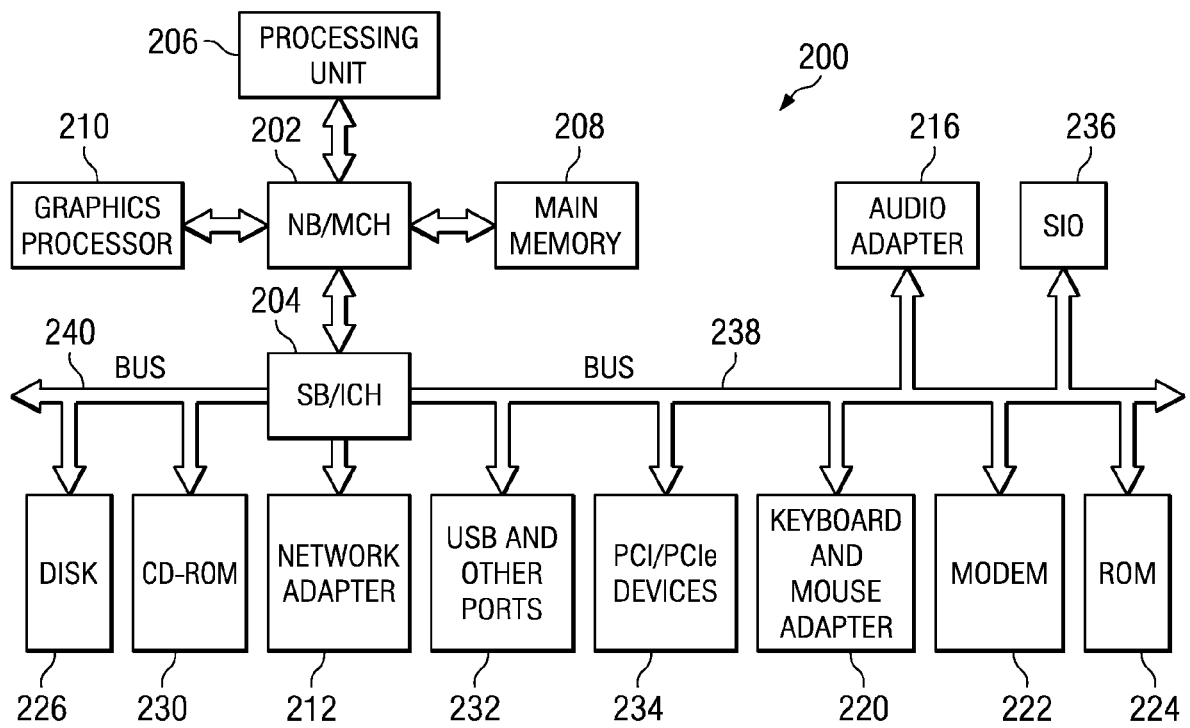
FIG. 2 is a block diagram of a data processing system in which aspects of the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA. As used herein, a storage device can be a main memory, a cache, a flash device, a hard disk drive, a tape storage device, or any other device for storing data.

The illustrative embodiments described herein provide for a method of collecting data regarding earthquakes and then using that data to model earthquakes, predict future earthquakes, and to predict tsunamis or other events that are related to seismic activity. Data is taken from the vibration sensors in hard disk drives of a vast network of data processing systems. The data is transmitted to and processed by a processing center. The processing center can take the form of one or more data processing systems that have hardware and software sufficient to analyze the incoming data.

Thus, the illustrative embodiments provide for a means of collecting a great deal of specific information about any particular seismic event. For example, in a typical city, millions of data processing systems in the form of computers at known, fixed locations can record various parameters of the seismic event. The data from these millions of computers can be used to produce precise modeling of the seismic event at each particular location that holds corresponding data processing systems.

Different parts of one particular building can also react in different ways to a particular seismic event. Because many data processing systems often exist in a single building or at different height levels of the building, the effects of the seismic event on a particular building can also be measured.

This vast plurality of data can then be processed by a processing center, which could be a supercomputer or a vast network of computers operating in parallel. The processing center can use the data to model precisely any given seismic event. In addition, the effects of the seismic event on a given building or on a given type of terrain can also be modeled precisely in a wide variety of geographical locations. The resulting maps and models can therefore have a high degree of granularity in terms of many data points for each of many different geographical locations. Thus, aspects of the illustrative embodiments provide for means to create highly detailed models of seismic events. These highly detailed models can be used to more accurately predict future earthquakes, more accurately predict tsunamis, and to more accurately detail how building codes should be structured so as to increase the durability of buildings during seismic events.

Figure 3:
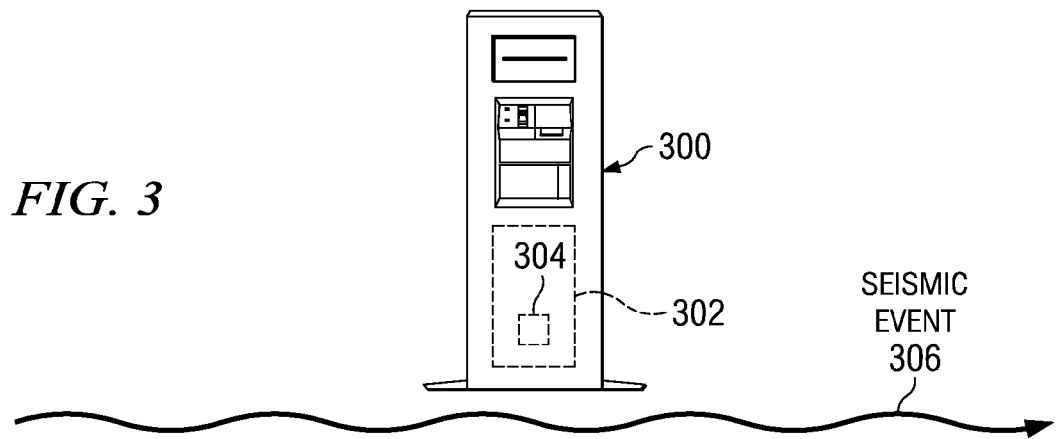
FIG. 3 illustrates a data processing system which is experiencing a seismic event in accordance with an illustrative embodiment.

FIG. 3 illustrates a data processing system which is experiencing a seismic event in accordance with an illustrative embodiment. Data processing system 300 shown in FIG. 3 can be any data processing system such as data processing systems 104, 106, 108, 110, 112, and 114 shown in FIG. 1 or data processing system 200 shown in FIG. 2. In the example shown in FIG. 3, data processing system 300 is a typical desktop computer. Data processing system 300 includes hard disk drive 302.

Hard disk drive 302 contains a vibration sensor, such as vibration sensor 304. A vibration sensor is any device that can detect vibration, acceleration, or other motion. Vibration sensors include accelerometers, actuators, cantilevers, electromagnetic devices, and other devices. An example of an accelerometer commonly found in data processing systems is a LIS3LV02DQ, which is a three dimensional microelectromechanical (MEMS) inertial sensor. This accelerometer can sense and measure static and dynamic acceleration along an X, Y, and Z axis. This acceleration could be a constant acceleration or a vibration. The illustrative embodiments described herein utilize the ability of the accelerometer to sense vibration across each of three axes. Because the illustrative embodiments described herein use the vibration detection capabilities of these accelerometers, in terms of their ability to measure accelerations caused by vibrations, these accelerometers can be considered to be vibration sensors. One or more vibration sensors are provided in hard disk drive 302 in order to provide a safety mechanism for hard disk drive 302. For example, if data processing system 300 were to be dropped, vibration sensor 304 could detect the free fall acceleration and immediately shut down hard disk drive 302 in order to prevent damage to the data on hard disk drive 302 or damage to hard disk drive 302 itself. The aspects of the illustrative embodiments described herein take advantage of the existence of vibration sensor 304 to detect the response of data processing system 300 to seismic event 306. Data processing system 300 can be configured to record data regarding seismic event 306.

Desktop computers work well with the illustrative embodiments described herein because they are usually located at a known, fixed location. However, any type data processing system can be used if data processing system 300 is at a known, fixed location. Any type of data processing system in motion can also be used if the motion of the data processing system can be subtracted from any motion caused by a seismic event or other event of interest. In the illustrative examples shown, the location of the data processing system is known and the location is fixed in that the data processing system does not move relative to the location.

In an illustrative example, vibration sensor 304 can record information such as the time when seismic event 306 starts, how long seismic event 306 lasts, the time seismic event 306 ends, the intensity of seismic event 306 at any given point in time during seismic event 306, frequency of motion of the seismic event at a geographical location, direction of motion of seismic event 306 at a geographical location, energy related to the seismic event, possibly other information regarding seismic event 306, and combinations thereof. The forgoing list shows examples of parameters related to seismic event 306. Other parameters related to seismic event 306 include location of the seismic event, epicenter of the seismic event, and other parameters.

As stated above, in the illustrative embodiments described herein, data processing system 300 is a desktop computer. Normally, laptop computers or other mobile forms of computers are not as suitable for use with the illustrative embodiments because they are mobile. Thus, the information gained from a vibration sensor of a mobile computer is not necessarily as reliable a measuring tool with respect to the parameters of seismic event 306. However, the illustrative embodiments described herein can be used with respect to any form of data processing system including laptop computers and other mobile data processing systems, particularly when such data processing systems are fixed to the ground or fixed to some surface such that information gained from vibration sensor 304 can accurately represent the parameters of seismic event 306.

In general, any data processing system that is at a known, fixed location can be used with the illustrative embodiments described herein. For example, vibration sensor at servers, rack servers, storage area network (SAN), or other data processing systems can be used. Additionally, any accelerometer or vibration sensor or other motion sensor attached to a known, fixed location can be used with the illustrative embodiments describe herein. Thus, for example, accelerometers or vibration sensors located at dams, radio towers, cell phone towers, or any other object can be used with the illustrative embodiments described herein, so long as such sensor can transmit data to a processing center, such as the processing center described in FIG. 4.

In addition to the above features, data processing system 300 or vibration sensor 304 or both can be modified to transmit a periodic or continuous operation signal to a processing center. The operation signal is a signal which the processing center interprets as an indication that the vibration sensor is operational and able to gather data regarding the motion of data processing system 300. The operation signal can also be referred to as a heartbeat signal. If the operation signal is not received when expected, then the processing center can interpret that lack of data as an indication that the corresponding sensor is not operating in the expected manner. Thus, the processing center can differentiate between a first situation where a lack of signal indicates a lack of seismic activity and a second situation where a lack of signal indicates that the sensor is not gathering data as expected.

Figure 4:
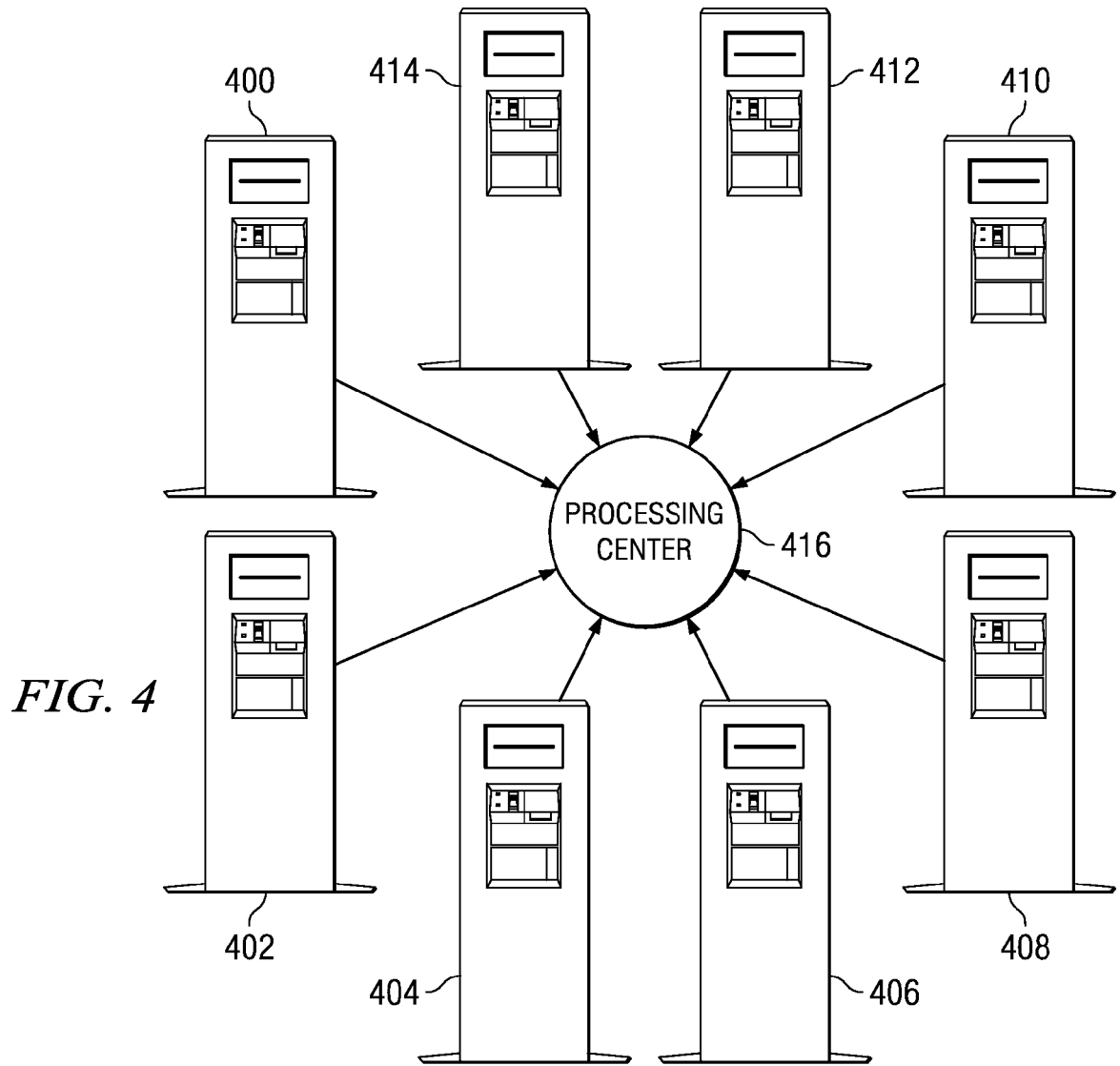
FIG. 4 illustrates a processing center to which a number of data processing systems are connected in accordance with an illustrative embodiment.

FIG. 4 illustrates a processing center to which a number of data processing systems are connected in accordance with an illustrative embodiment. FIG. 4 illustrates a number of data processing systems, such as data processing systems 400, 402, 404, 406, 408, 410, 412, and 414. Each of data processing systems 400-414 can be any type of data processing system, such as data processing systems 104, 106, 108, 110, 112, and 114 in FIG. 1 or data processing system 200 in FIG. 2. Each one of data processing systems 400-414 can also be configured as described with respect to data processing system 300 as in FIG. 3. Additionally, each of data processing systems 400-414 are equipped with a vibration sensor which can be used to detect various parameters a seismic event, such as seismic event 306 shown in FIG. 3.

Processing center 416 receives information regarding a particular seismic event from each of data processing systems 400-414. Processing center 416 then uses the data transmitted from the various data processing systems 400-414 to analyze a particular seismic event. Processing center 416 can use the data acquired from data processing systems 400-414 in conjunction with data regarding geological surveys of a given geographical area, other maps of a geological area, or architectural designs, or other engineering reports regarding particular buildings containing data processing system 400-414 to produce a highly detailed model of a particular seismic event at a particular geographical area and even at a particular building in a geographical area.

Processing center 416 can take the form of one or more data processing systems, such as data processing systems 104, 106, 108, 110, 112, and 114 in FIG. 1 or data processing system 200 as in FIG. 2. Processing center 416 can be many data processing systems operating in parallel with different data processing systems potentially being located in different physical geographical locations. Processing center 416 can also be one or more supercomputers designed to receive and process data from data processing systems 400-414 to model a particular seismic event. Processing center 416 is also designed to use the data from data processing systems 400-414 in conjunction with potentially many other sources of data, such as geological surveys, in order to produce predictions of future earthquakes related to the particular seismic event or to predict subsequent seismic events, including tsunamis, volcanic eruptions, and others. In addition, processing center 416 can produce models of behaviors of particular buildings that experienced the particular seismic event.

In an illustrative example, processing center 416 is a hierarchical system of sub-processing centers. A sub-processing center is one or more data processing systems that receive data from other sub-data processing centers or from individual sensors, and that transmits data to some other processing center higher in the hierarchical structure. For example, individual sensors in a building can transmit data to a first level sub-processing center in the building. Among many buildings in a city, groups of first level sub-processing centers can transmit data to a second level sub-processing center for the city. Among groups of cities, groups of second level sub-processing centers can transmit data to a third level sub-processing center for a region. Among groups of regions, groups of third level sub-processing centers can transmit data to a fourth level sub-processing center for a nation. Among groups of nations, groups of fourth level sub-processing centers can transmit data to a fifth level sub-processing center for a continent. Among all continents, the fifth level sub-processing centers transmit data to a sixth level processing center for the entire planet. Together, the entire set of first through sixth level processing centers form a hierarchical processing center. Processing center 416 can be this hierarchical processing center.

Although the embodiment described above provides for an exemplary hierarchical structure for a hierarchical processing center, many other hierarchies could be constructed. Thus, for example, more or fewer groups of sub-processing centers could be used. Hierarchies can be based on parameters other than geographical location such as, for example, population density, frequency of seismic activity, or other parameters.

A hierarchical processing center can have certain advantages. For example, the hierarchical processing center, in a way, acts as a very large parallel processing data processing system. Thus, real time data can be processed much more quickly than if each individual sensor is processed at a single data processing system, even if the data processing system is a super computer. Additionally, local data can be shared with local authorities more quickly via a local sub-processing center. The quick response time can increase the ability of local authorities to respond effectively to the effects of an earthquake or tsunami, or to take precautions in the even that a subsequent earthquake or tsunami is predicted by the sub-processing center.

Nevertheless, additional information can be gained by comparing local data gathered and processed by a local sub-processing center to regional data gathered and processed by a regional sub-processing center. For example, trends or patterns in seismic activity on a regional scale can be used to predict earthquakes on a regional scale. Thus, the higher levels of hierarchical processing provide useful features to the overall processing center 416.

Figure 5:
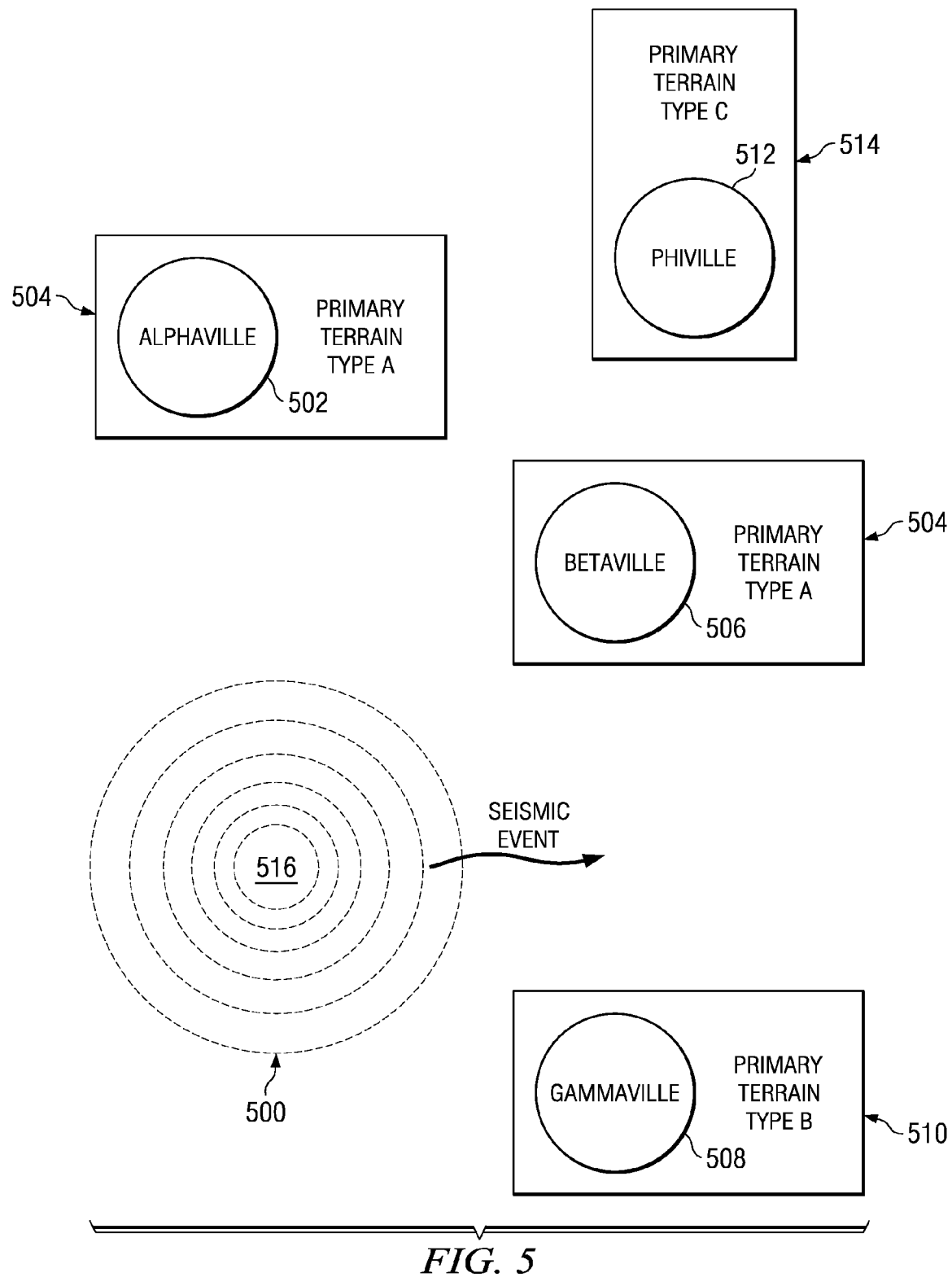
FIG. 5 is a map showing relative locations of a seismic event and a number of cities in accordance with an illustrative embodiment.

FIG. 5 is a map showing relative locations of a seismic event and a number of cities in accordance with an illustrative embodiment. The map shown in FIG. 5 is not drawn to any particular scale and refers to fictitious cities in exemplary, abstracted terrain types.

As shown in FIG. 5, seismic event 500 takes place within the realm of four different cities, including Alphaville 502 that rests in primary terrain type A 504, Betaville 506 that also rests in primary terrain type A 504, Gammaville 508 that rests in primary terrain type B 510, and Phiville 512 that rests in primary terrain type C 514. Seismic event 500 will ultimately impact each of the cities shown in FIG. 5, including Alphaville 502, Betaville 506, Gammaville 508, and Phiville 512. However, the effect of seismic event 500 on each of these cities may be very different given different primary terrain types.

A primary terrain type is a type of terrain that predominantly prevails in a particular geographical area. A primary terrain type can include many different types of terrain types, some of which are completely different from the primary terrain type. However, the primary terrain type represents the most predominant type of terrain in a particular geographical area. Examples of terrain types include rocky terrain, sandy terrain, hilly terrain, or any of numerous terrain types identified by geological sciences or by the United States Geological Service. Thus, whereas Alphaville 502 and Betaville 506 may experience similar reactions to seismic event 500 because both are in primary terrain type A 504, Gammaville 508 and Phiville 512 may experience different effects from seismic event 500 due to the fact that they are in different primary terrain types.

Some geographical areas have sufficiently heterogeneous terrain types that a primary terrain type might not apply to a particular city. In these types of areas, the illustrative embodiments described herein are particularly useful because data regarding the reaction to a seismic event of each individual building within each individual terrain type can be measured, collected, and processed to produce macro-view conclusion data.

In the past, only gross information about seismic event 500 would be known or collected. For example, the measurement of seismic event 500 on the Richter Scale might be published quite quickly. Likewise, epicenter 516 of seismic event 500 can be determined with some precision. However, this information does not convey detailed information regarding how particular buildings and particular cities actually react to seismic event 500.

Using the illustrative embodiments described herein, individual desktop computers in each of cities Alphaville 502, Betaville 506, Gammaville 508, and Phiville 512 can be used to accurately and precisely model what occurs in each given city, in each given primary terrain type, in response to seismic event 500.

Figure 6:
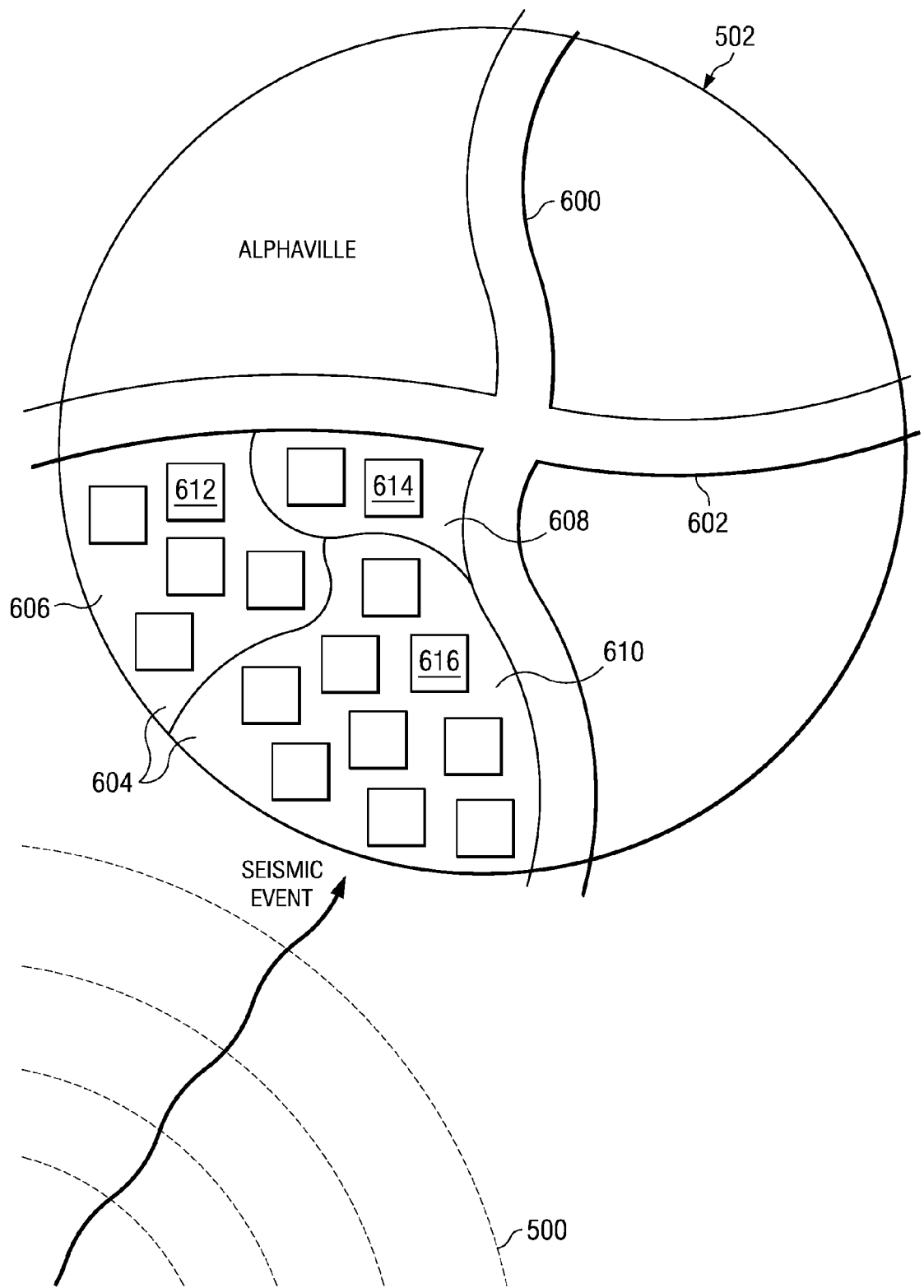
FIG. 6 is a map of a city relative to a seismic event in accordance with an illustrative embodiment.

FIG. 6 is a map of a city relative to a seismic event in accordance with an illustrative embodiment. FIG. 6 shows a detailed view of Alphaville 502. Alphaville 502 corresponds to Alphaville 502 shown in FIG. 5. The map shown in FIG. 6 is not to any particular scale and Alphaville 502 is a fictitious city. The reference Alphaville 502 is divided into four sectors by major roads including major road 600 and major road 602.

Particular attention is drawn to quadrant 604, which contains three different terrain sub-types, terrain sub-type 606, terrain sub-type 608, and terrain sub-type 610. In addition, quadrant 604 includes a number of buildings. Example buildings include building 612 in terrain sub-type 606, building 614 in terrain sub-type 608, and building 616 in terrain sub-type 610.

As shown in FIG. 6, seismic event 500, which can be seismic event 306 shown in FIG. 3 or seismic event 500 shown in FIG. 5, will affect the city of Alphaville 502. However, seismic event 500 can have different affects on each of the different terrain types and terrain sub-types 606, 608, and 610. Furthermore, seismic event 500 can have different affects on different buildings depending on building construction, building location, building materials, geology of the land upon which the building rests, or other parameters. Thus, in this example, buildings 612, 614, and 616 will each react to seismic event 500 in different ways even if each building is constructed in an identical fashion.

The illustrative embodiments described herein provide a method of using computers or other data processing systems containing vibration sensors, such as vibration sensor 304 shown in FIG. 3, to measure the effects of seismic event 500 in each of the buildings 612, 614, 616, and in all other buildings shown in quadrant 604. In addition, other data processing systems, not necessarily within these buildings, can be used to collect information regarding seismic event 500. All information collected is sent to a processing center, such as processing center 416 shown in FIG. 4.

Figure 7:
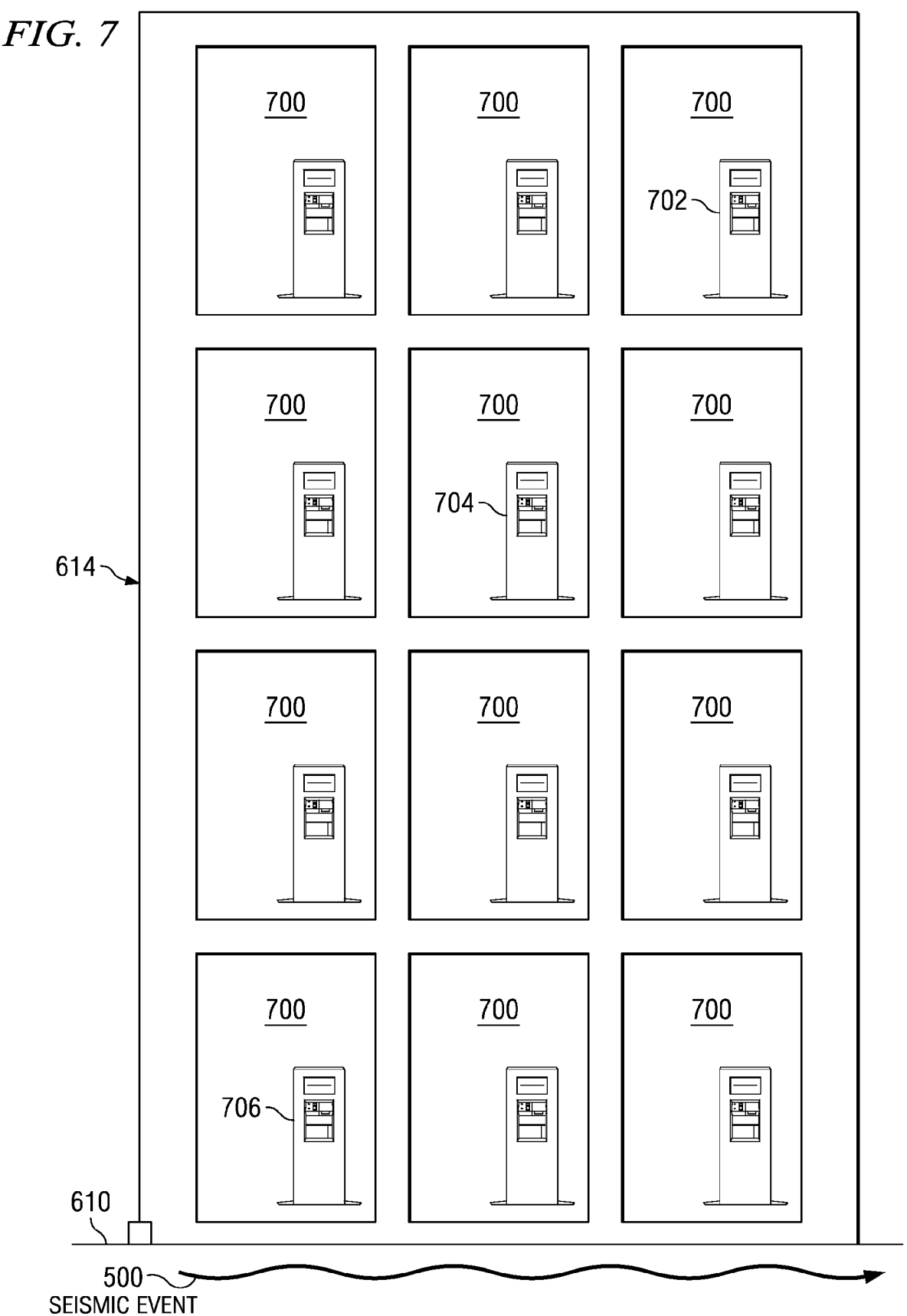
FIG. 7 illustrates a building experiencing a seismic event in accordance with an illustrative embodiment.

FIG. 7 illustrates a building experiencing a seismic event in accordance with an illustrative embodiment. Seismic event 500 can be seismic event 500 shown in FIG. 6 and FIG. 5, and also seismic event 306 shown in FIG. 3. Building 614 is building 614 shown in FIG. 6. Building 614 rests on terrain sub-type 610, also as shown in FIG. 6.

Building 614 is shown with a number of windows 700. As shown inside each of the windows, building 614 contains many data processing systems including data processing system 702, data processing system 704, and data processing system 706. Each of data processing systems 702-706 can be a data processing system such as data processing systems 104, 106, 108, 110, 112, and 114 shown in FIG. 1, data processing system 200 as shown in FIG. 2, data processing system 300 as shown in FIG. 3, or data processing systems 400-414 as shown in FIG. 4.

As seismic event 500 propagates through terrain sub-type 610, building 614 reacts by shaking, twisting, moving up and down, moving side to side, and possibly other forms of motion in response to seismic event 500. Via vibration sensors in their hard disk drives, each of data processing systems 702-706 and other data processing systems in building 614 record the motion of each particular corresponding data processing system. In this manner, data is collected regarding the motion of each of data processing systems 702-706. If a particular data processing system has more than one vibration sensor, such as a server rack having vibration sensors located at different heights along the server rack, then each sensor records information.

Because information regarding motion is recorded at various locations within a building, the amount of lateral translation, angular translation, force, torque, impulse (the third derivative of position, also known as jerk), and other motions and forces can be measured or derived for many different parts of a building. Thus, the motion and response of a building to a seismic event can be measured or derived using the information gathered by all of the vibration sensors or accelerometers located within the data processing systems within the building. In this manner, models of how individual buildings react to a seismic event can be created. These types of models can be referred to as models of building dynamics. The reaction of similar building types, or buildings made from similar materials or similar engineering techniques, to seismic events can then be inferred. Thus, the data collected by the vibration sensors and/or accelerometers can be used to establish building codes or to create new engineering techniques to prevent building damage or building collapse in response to a seismic event.

Thus, the illustrative embodiments described herein provide a mechanism for measuring the reaction of a building, at various points within a building, to a seismic event. This information can be used to model the effects of seismic events on other buildings and can be used to determine building codes when constructing buildings on a particular terrain sub-type in a particular geographical location.

Figure 8:
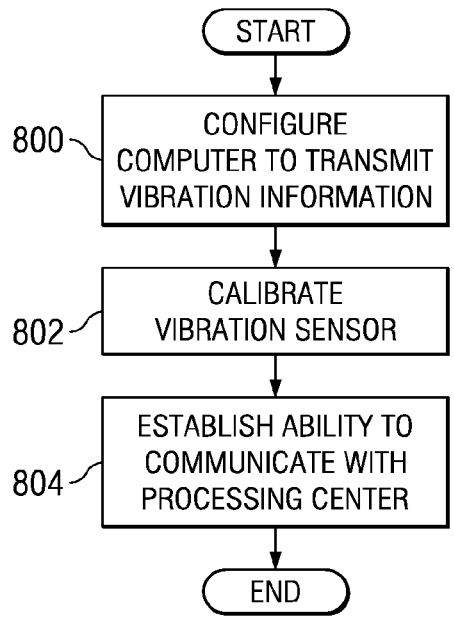
FIG. 8 is a flowchart representing a process for connecting a data processing system to a processing center in accordance with an illustrative embodiment.

FIG. 8 is a flowchart representing a process for connecting a data processing system to a processing center in accordance with an illustrative embodiment. The illustrative process shown in FIG. 8 can be implemented in a data processing system and by a data processing system, such as data processing systems 104, 106, 108, 110, 112, and 114 as shown in FIG. 1 and data processing system 200 as shown in FIG. 2. In particular, the process shown in FIG. 8 can be implemented using hardware, software, or a combination of hardware and software. Together, or separately, the hardware separately can be referred to as a system.

The process begins as the system configures a computer to transmit vibration information (step 800). Vibration information can be obtained from a vibration sensor, such as a vibration sensor commonly associated with a hard disk drive of a data processing system. However, vibration information can be obtained from any particular vibration sensor connected to the computer. Vibration information can also be obtained from any particular vibration sensor that is remotely connected to the computer. Vibration information can include any form of data related to parameters detected by any accelerometer, a cantilever, an actuator or any other device that can be used to sense motion of vibration or acceleration. The computer can transmit vibration information via a network using network hardware, software, or a combination of hardware and software. An example of such a network is network 102 as shown in FIG. 1. Vibration information can be transmitted from an individual data processing system via a modem, network adapter, such as network adapter 212 as shown in FIG. 2, or other communications device. Thus, other forms of communication hardware and software can be used to transmit vibration information.

The process continues as the system calibrates the vibration sensor (step 802). The vibration sensor is calibrated by measuring vibrations or motions commonly experienced by that particular data processing system. These common or expected vibrations, known as background noise, are discarded from data that might be related to a seismic event. For example, a data processing system that resides in a building located next to a freeway or near a mining operation will experience a great deal of normal vibration. The same type of data processing system located in a quiet, geologically stable area will not experience much background vibration. In order to account for this type of difference, vibration sensors in each of the corresponding computers are calibrated so that only information related to a seismic event will be transmitted to a processing center.

Additional calibrations may also be desired or applied. For example, correction factors might be used to correct for systematic errors or other types of errors in accelerometer measurements. An example of a correction factor includes a location factor for accounting for a specific location of a given accelerometer within a given system, building, or area. Another correction factor is a type correction for correcting for the differences between different types of individual accelerometers or other vibration sensors. Another correction factor is accounting for temperature affects on how a building, which houses the data processing system, moves. Another correction factor is accounting for temperature affects on the measurements taken by the accelerometer. Other correction factors can also be taken into account, such as wind speed and direction, recent rainfall, the presence of fire, a known schedule of a subway train that vibrates nearby structures, or other factors that can affect a motion of a building or can affect how a particular accelerometer records acceleration. Thus, for example, if a skyscraper is experiencing a high wind, then motion of the skyscraper due to that wind can be accounted if the wind velocity is known and the building's response to wind is known. The motion of the skyscraper due to wind can then be subtracted from other motion data. Thus, a difference between a seismic event and a high wind can be accounted for when collecting data at individual accelerometers or at any selected level of processing center.

In addition to these correction factors, generally any event that does not affect nearly all vibration sensors in a given geographical area can be detected and accounted. Thus, for example, if nearly all accelerometers or vibration sensors in a given area report abnormal measurements, then a seismic event is likely. In this case, an average history of previous measurements for each vibration sensor, taken at a particular time, can be subtracted from measurements taken during a seismic event. In this way, all accelerometers or vibration sensors can be calibrated simultaneously upon detection of a seismic event. In an illustrative example, a fast Fourier transform from a power domain to a frequency domain can be used to ferret out measurements that do not correspond to a seismic event.

Similarly, vibration sensors can be calibrated against measurements taken during previous, known seismic events of known size and known location. Likewise, vibration sensors can be calibrated against average measurements taken during a number of events. By calibrating against measurements taken during previous, known seismic events, processing centers of different levels, or even individual data processing systems, can learn to account for non-linear factors when calibrating individual vibration sensors.

Additionally, during calibration, different orientations of accelerometers in different computers can be accounted via signals from the individual accelerometers. For example, direction of motion of an individual vibration sensor can be processed. Thus, vibration modes of a building can be detected. For example, an eight foot server rack could experience two different vibration modes of the building because a sensor at the bottom of the server rack experiences one vibration mode and a sensor at the top of the server rack experiences a second vibration mode. Measurements taken by the two accelerometers can be used to detect the differences in motion and, together with other measurements, can be used to determine the two vibration modes of the building.

The process continues as the system establishes the ability to communicate with the processing center (step 804). In the illustrative embodiments described herein, the data processing system should be able to communicate with a processing center, such as processing center 416 shown in FIG. 4, at any given moment in time. Thus, data can be transmitted and processed in real time. However, data can be collected at any given vibration sensor and then transmitted to a processing center at a later point in time. In any case, the process terminates thereafter.

Figure 9:
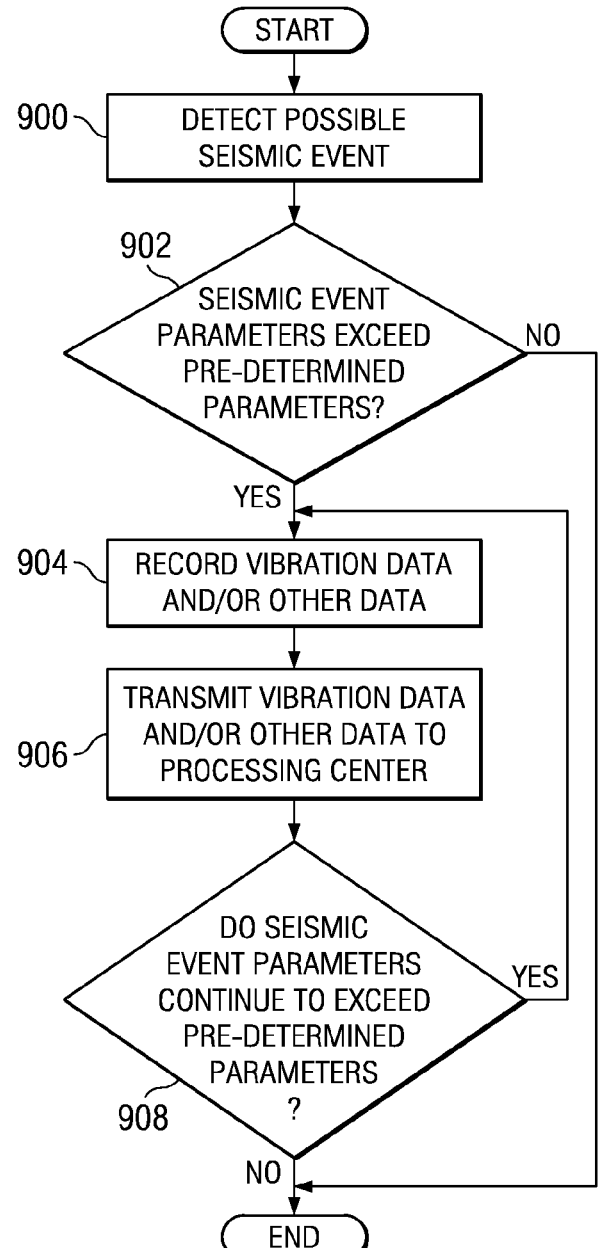
FIG. 9 is a flowchart illustrating a process of using a vibration sensor of one or more data processing systems to record data regarding a seismic event in accordance with an illustrative embodiment.

FIG. 9 is a flowchart illustrating a process of using a vibration sensor of one or more data processing systems to record data regarding a seismic event in accordance with an illustrative embodiment. The process shown in FIG. 9 can be implemented in a data processing system, such as data processing systems 104, 106, 108, 110, 112, and 114 as shown in FIG. 1 or data processing system 200 as shown in FIG. 2. In particular, the process shown in FIG. 9 is implemented using a vibration sensor such as vibration sensor 304 shown in FIG. 3 or a vibration center with respect to FIG. 8. The process shown in FIG. 9 can be implemented using hardware, software, or a combination of hardware and software. Together or separately, the hardware and software can be referred to as a system.

The process begins as the system detects a possible seismic event (step 900). A seismic event is any event which causes a vibration sensor to detect motion of the corresponding hard disk drive or the corresponding data processing system, though in an illustrative example a seismic event is caused by the ground shaking. The system then determines whether the seismic event exceeds pre-determined parameters (step 902). A seismic event exceeds pre-determined parameters if some aspect of the seismic event exceeds a value that is set during calibration of the vibration sensor. Thus, a pre-determined parameter can be motion or acceleration that exceeds the expected background motion or vibration for that corresponding hard disk drive or data processing system. The seismic event parameters can include motion or acceleration in all three space dimensions. Seismic event parameters can also include any form of angular motion or angular acceleration. If the seismic event parameters do not exceed the pre-determined parameters (a "no" to the determination in step 902), then the process terminates.

However, if the seismic event parameters do exceed the pre-determined parameters (a "yes" to the determination in step 902), then the system records vibration data and/or other data regarding the seismic event (step 904). The system then transmits the vibration data and/or other data to a processing center (step 906). The system then determines whether the seismic event continues to exceed the pre-determined parameters at step 908. If the seismic event does continue to exceed pre-determined parameters (a "yes" to the determination at step 908), then the process returns to step 904 and data continues to be collected for the duration of the seismic event. However, when the seismic event parameters do not continue to exceed the pre-determined parameters (a "no" to the determination at step 908), the process then terminates.

Figure 10:
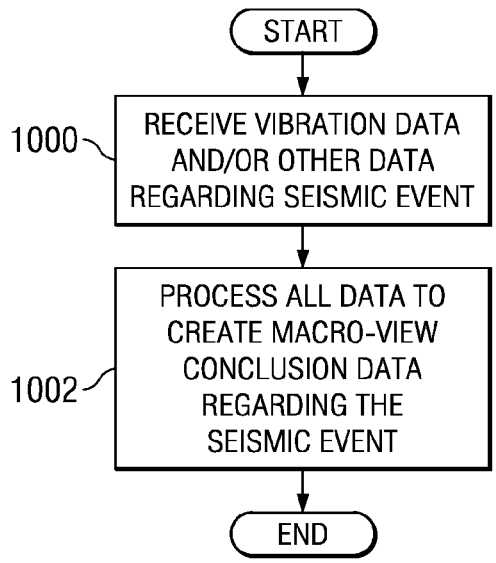
FIG. 10 is a flowchart illustrating processing of data collected regarding a seismic event in accordance with an illustrative embodiment.

FIG. 10 is a flowchart illustrating processing of data collected regarding a seismic event in accordance with an illustrative embodiment. The process shown in FIG. 10 can be implemented in a data processing system, such as data processing systems 104, 106, 108, 110, 112, and 114 as shown in FIG. 1 and data processing system 200 as shown in FIG. 2. In particular, the process shown in FIG. 10 is implemented in a processing center, such as processing center 416 shown in FIG. 4.

The process begins as the processing center receives vibration data and/or other data regarding a seismic event from a plurality of data processing systems (step 1000). The processing center then processes all data to create macro-view conclusion data regarding the seismic event (step 1002), with the process terminating thereafter.

Macro-view conclusion data can be any set of data that relates to a conclusion drawn from the collective data at step 1000. Examples of macro-view conclusion data include a prediction of a future earthquake related to the earthquake detected at step 1000, prediction of a tsunami related to the earthquake detected at step 1000, a map or model of the seismic event detected at step 1000, a model of the seismic event detected at step 1000 by geographical location, a model of the seismic event detected at step 1000 by terrain type, a probability distribution of injuries to persons, a probability distribution of damage to property, an assessment of damage to a particular building, an assessment of damage to buildings in a geographical area based on ground type, an assessment of a probability of collapse of a particular building, a model of a behavior of a particular building in reaction to the seismic event detected at step 1000, data related to any other conclusion that can be drawn from the data collected at step 1000, or combinations thereof.

Thus, the illustrative embodiments described herein provide a tool for assessing specific damage to specific buildings. Measurement of the motion of many vibration sensors within many locations within a building can be used to create a model of how a building moved during a particular seismic event. Torque, force, energy concentration, and impulse can be assessed at various points throughout a building. From this information, possibly in combination with other information such as known reactions of building types, foundation types, building material types, or other information, an assessment can be made as to which buildings probably have broken welds, damaged foundations, or other forms of damage.

Additionally, a determination can be made as to which buildings are likely to collapse. Buildings can be categorized with respect to level of damage in a process comparable to a form of triage for property. Buildings most likely to collapse, or buildings for which collapse would be catastrophic (such as by collapsing on other buildings or on major roadways) can be designated to receive attention or remediation first in order to mitigate further damage caused by building collapse.

Some of these forms of damage are not easily detectable by visual inspection. By assessing which buildings are likely to have serious but not visible damage, authorities can close or evacuate these types of dangerous buildings, which may be likely to collapse during aftershocks or future earthquakes.

Similarly, an assessment can be made to determine those buildings which may have cosmetic damage but are likely to be structurally sound. Such buildings can be opened or left open, thereby minimizing disruption to the owners or occupants of the building.

Thus, the illustrative embodiments described herein provide for a means of creating detailed models of seismic events. Detailed models of seismic events, in turn, can be used to predict future earthquakes, to predict whether a tsunami will result from a particular earthquake, the response of particular buildings or particular terrain types to a seismic event, and other useful information that can be used to reduce the severity of impact of seismic events on human built structures. Thus, in addition, the illustrative embodiments described herein can be used to create a very large network of disk drive based sensors to detect and classify vibration activity. The illustrative embodiments identify vibration activity that has a high probability of being an earthquake or other seismic event.

However, vibration activity can also be used to detect other types of events. For example, vibration activity can be used to quantify or model the reaction of terrain types or buildings to other major events, such as bombings, nuclear explosions, asteroid impacts, pipeline explosions, fuel reactions, building collapse, wind, hurricane, tornado, flood, or any other large scale or localized effect that affects the building or terrain. Because the illustrative embodiments described herein can be used with respect to numerous data processing systems in a particular building, the illustrative embodiments can be used to model how a building reacts to a particular event regardless of whether or not the event is derived from an earthquake, explosion, or some other event. Additionally, because data is collected from many data processing systems distributed over wide geographical locations, the location of data processing systems can be compared to determine whether a particular event is localized or large. A localized event affects a single building or a group of buildings. A large event affects entire cities or regions. Thus, a seismic event, which is usually a large event, can be differentiated from a non-seismic event, such as most localized events.

In any case, data collected by these numerous data processing systems can be transmitted via high speed networking to processors in a processing center which can synthesize the data, classify the events, and enrich the data through the use of known data enrichment programs, all in real time. The information can also be collected to produce outputs in a form that can be used by various decision makers, including the emergency responders, such as police, fire fighters, the Federal Emergency Management Agency or other service providers.

In addition to using the data from the vast network of vibration sensors, the processing center can also use other data when creating macro-view conclusion data. For example, data from existing seismographs can be incorporated into the set of data when processing for macro-view conclusion data. Other data, such as a geological map of a geographical location, a geographical map of a geographical location, a building code, building type, building design, an architectural design, an engineering study, a geological survey of a geographical location, a geophysical study of a geographical location, a map of a seashore, a model of a seashore, a map of an ocean floor, a model of ocean dynamics, areas historically susceptible to damage by one of tsunamis, earthquakes, and both tsunamis and earthquakes, a second set of data regarding a second parameter of a previous seismic event, and combinations thereof can also be included for use by the processing center in creating macro-view conclusion data.

The processing center can perform processing on a hierarchical basis with data fed into one or more processing engines to produce the macro-view conclusion data. The data could be further synthesized with other data and catastrophe models to provide guidance as to who and what would be potentially affected by a seismic event or other event and to what degree.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of producing a macro-view conclusion data related to a seismic event, the method comprising:
   receiving at a processing center a set of data related to a parameter of the seismic event, wherein the parameter is measured using a vibration sensor of a hard disk drive of a computer at a known, fixed location in a building, and wherein the vibration sensor produces the set of data;
   processing the set of data at the processing center to produce a first macro-view conclusion data;
   storing the first macro-view conclusion data in a storage device;
   receiving a first set of additional data at the processing center, wherein the first set of additional data at least comprises a geographical map of a geographical location of the known fixed location, a description of engineering techniques and materials used to construct the building, and a description of the terrain sub-type on which the building was constructed; and
   processing the first set of additional data together with the set of data to produce a second macro-view conclusion data.

2. The computer implemented method of claim 1 further comprising:
   receiving at the processing center a second set of data related to the parameter, wherein the parameter is also measured using a second vibration sensor of a second hard disk drive of a second computer at a second known, fixed location, and wherein the second vibration sensor produces the second set of data; and
   processing the second set of data together with processing the set of data to produce a third macro-view conclusion data.

3. The computer implemented method of claim 2 further comprising:
   receiving a second set of additional data at the processing center; and
   processing the second set of additional data together with the second set of data to produce a fourth macro-view conclusion data, wherein the second set of additional data comprises at least one of the geographical map of the geographical location, a building code, a building type, a building design, an architectural design, an engineering study, a geological survey of the geographical location, a geophysical study of the geographical location, a map of a seashore, a model of the seashore, a map of an ocean floor, a model of ocean dynamics, a map indicating areas historically susceptible to damage by one of tsunamis, earthquakes, and both tsunamis and earthquakes, the second set of data regarding a second parameter of a previous seismic event, and combinations thereof.

4. The computer implemented method of claim 1, wherein the first set of additional data additionally comprises at least one of an architectural design, an engineering study, a geological survey of the geographical location, a geophysical study of the geographical location, a map of a seashore, a model of the seashore, a map of an ocean floor, a model of ocean dynamics, a map indicating areas historically susceptible to damage by one of tsunamis, earthquakes, and both tsunamis and earthquakes, the second set of data regarding a second parameter of a previous seismic event, and combinations thereof.

5. The computer implemented method of claim 1 wherein the parameter is at least one of a start time of the seismic event, end time of the seismic event, duration of the seismic event, frequency of motion of the seismic event at the geographical location, direction of motion of the seismic event at the geographical location, energy related to the seismic event, location of the seismic event, epicenter of the seismic event, and combinations thereof.

6. The computer implemented method of claim 1 wherein the seismic event comprises one of an explosion and a building collapse.

7. The computer implemented method of claim 1 wherein the first macro-view conclusion data comprises at least one of a first prediction of a second future seismic event, a second prediction of a tsunami, a model of the seismic event by the geographical location, a model of the seismic event by terrain type, a probability distribution of injuries to persons, a probability distribution of damage to property, an assessment of damage to a particular building, an assessment of damage to buildings in a geographical area based on ground type, an assessment of a probability of collapse of a particular building, and a model of a behavior of a particular building in reaction to the seismic event.

8. The computer implemented method of claim 1 further comprising:
   differentiating the seismic event from a second, non-seismic event.

9. The computer implemented method of claim 8 wherein the non-seismic event is one of a hurricane, a wind, a flood, a localized explosion, and a localized event.

10. A data processing system comprising:
    a bus;
    a memory connected to the bus, wherein the memory contains a set of instructions for producing macro-view conclusion data related to a seismic event;
    a processor connected to the bus, wherein the processor executes the set of instructions to:
    receive at a processing center a set of data related to a parameter of the seismic event, wherein the parameter is measured using a vibration sensor of a hard disk drive of a computer at a known, fixed location in a building, and wherein the vibration sensor produces the set of data;
    process the set of data at the processing center to produce a first macro-view conclusion data;
    store the first macro-view conclusion data in a storage device;
    receive a first set of additional data at the processing center, wherein the first set of additional data at least comprises a geographical map of a geographical location of the known fixed location, a description of engineering techniques and materials used to construct the building, and a description of the terrain sub-type on which the building was constructed; and process the first set of additional data together with the set of data to produce a second macro-view conclusion data.

11. The data processing system of claim 10 wherein the processor further executes the set of instructions to:

receive at the processing center a second set of data related to the parameter, wherein the parameter is also measured using a second vibration sensor of a second hard disk drive of a second computer at a second known, fixed location, and wherein the second vibration sensor produces the second set of data; and process the second set of data together with processing the set of data to produce a third macro-view conclusion data.

12. The data processing system of claim 11 wherein the processor further executes the set of instructions to:

receive a second set of additional data at the processing center; and process the second set of additional data together with the second set of data to produce a fourth macro-view conclusion data, wherein the additional data comprises at least one of the geographical map of the geographical location, a building code, the building type, the building design, an architectural design, an engineering study, a geological survey of the geographical location, a geophysical study of the geographical location, a map of a seashore, a model of the seashore, a map of an ocean floor, a model of ocean dynamics, a map indicating areas historically susceptible to damage by one of tsunamis, earthquakes, and both tsunamis and earthquakes, and combinations thereof.

13. The data processing system of claim 10, wherein the first set of additional data additionally comprises at least one of a geographical map of an architectural design, an engineering study, a geological survey of the geographical location, a geophysical study of the geographical location, a map of a seashore, a model of the seashore, a map of an ocean floor, a model of ocean dynamics, a map indicating areas historically susceptible to damage by one of tsunamis, earthquakes, and both tsunamis and earthquakes, the second set of data regarding a second parameter of a previous seismic event, and combinations thereof.

14. The data processing system of claim 10 wherein the parameter is at least one of a start time of the seismic event, end time of the seismic event, duration of the seismic event, frequency of motion of the seismic event at the geographical location, direction of motion of the seismic event at the geographical location, energy related to the seismic event, location of the seismic event, epicenter of the seismic event, and combinations thereof.

15. The data processing system of claim 10 wherein the first macro-view conclusion data comprises at least one of a first prediction of a second future seismic event, a second prediction of a tsunami, a model of the seismic event by the geographical location, a model of the seismic event by terrain type, a probability distribution of injuries to persons, a probability distribution of damage to property, and a model of a behavior of a particular building in reaction to the seismic event.

16. The data processing system of claim 10 wherein the processor further executes the set of instructions to:

differentiate the seismic event from a second, non-seismic event.

17. A computer program product comprising:

a computer usable storage medium having computer usable program code for producing a macro-view conclusion data related to a seismic event, wherein the computer program product includes:

computer usable program code for receiving at a processing center a set of data related to a parameter of the seismic event, wherein the parameter is measured using a vibration sensor of a hard disk drive of a computer at a known, fixed location in a building, and wherein the vibration sensor produces the set of data;

computer usable program code for processing the set of data at the processing center to produce a first macro-view conclusion data;

computer usable program code for storing the first macro-view conclusion data in a storage device;

computer usable program code for receiving a first set of additional data at the processing center, wherein the first set of additional data at least comprises a geographical map of a geographical location of the known fixed location, a description of engineering techniques and materials used to construct the building, and a description of the terrain sub-type on which the building was constructed; and computer usable program code for processing the first set of additional data together with the set of data to produce a second macro-view conclusion data.

18. The computer program product of claim 17 further comprising:

computer usable program code for receiving at the processing center a second set of data related to the parameter, wherein the parameter is also measured using a second vibration sensor of a second hard disk drive of a second computer at a second known, fixed location, and wherein the second vibration sensor produces the second set of data; and computer usable program code for processing the second set of data together with processing the set of data to produce a third macro-view conclusion data.

* * * * *